United States Patent
West, Jr.

(10) Patent No.: US 6,509,994 B2
(45) Date of Patent: Jan. 21, 2003

(54) BURST-MODE ANALOG TRANSMITTER

(75) Inventor: Lamar E. West, Jr., Maysville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 15 days.

(21) Appl. No.: 09/840,753

(22) Filed: Apr. 23, 2001

(65) Prior Publication Data

US 2002/0154371 A1 Oct. 24, 2002

(51) Int. Cl.$^7$ .......................... H04B 10/00; H04B 10/04
(52) U.S. Cl. .................................. 359/180; 372/29.011
(58) Field of Search .................. 359/180–188; 372/29.011, 38.1, 38.01, 38.02, 38.03, 38.07

(56) References Cited

U.S. PATENT DOCUMENTS

| | | | |
|---|---|---|---|
| 5,519,530 A | * 5/1996 | Utsumi | 359/124 |
| 5,724,170 A | * 3/1998 | Aizawa | 359/187 |
| 6,137,607 A | 10/2000 | Feldman et al. | |
| 6,256,329 B1 | * 7/2001 | Ishizuka et al. | 372/30 |
| 6,282,216 B1 | * 8/2001 | Ikeuchi et al. | 372/29.01 |
| 2002/0075919 A1 | * 6/2002 | Tochio | 372/38.02 |

FOREIGN PATENT DOCUMENTS

| | | | | |
|---|---|---|---|---|
| JP | 62066745 A | * 3/1987 | | H04L/27/14 |
| JP | 362066745 | 3/1987 | | |
| JP | 2002044030 A | * 2/2002 | | H04B/10/105 |
| JP | 2002044030 | 8/2002 | | |

* cited by examiner

*Primary Examiner*—Jason Chan
*Assistant Examiner*—Agustin Bello
(74) *Attorney, Agent, or Firm*—Hubert J. Barnhardt, III; Kenneth M. Massaroni; Shelley L. Couturier

(57) ABSTRACT

A burst-mode optical transmitter (405) for receiving reverse electrical signals and for providing a reverse optical signal in a communications network. The optical transmitter includes a carrier-detect circuit (510) for detecting the presence of reverse electrical signals and a laser (535) for converting the reverse electrical signals into reverse optical signals for further transmission. The carrier-detect circuit (510) controls a switch (515), whereby when the carrier-detect circuit (510) detects the presence of reverse electrical signals, the carrier-detect circuit (510) closes the switch (515) activating the laser (535). When a reverse electrical signal is present, the carrier-detect circuit (510) opens the switch (515), deactivating the laser (535). In this manner, the burst-mode optical transmitter (405) only transmits reverse optical signals when reverse electrical signals are present. The reverse optical signals from a plurality of optical transmitters (405) can then be combined and transmitted further upstream via a single fiber path.

7 Claims, 6 Drawing Sheets

405

BURST-MODE ANALOG TRANSMITTER

FIELD OF THE INVENTION

This invention relates generally to broadband communications systems, such as cable television systems, and more specifically to an optical transmitter and a method of transmitting reverse analog signals within the optical transmitter by a burst-mode technique.

BACKGROUND OF THE INVENTION

A broadband communications system 100, such as a two-way hybrid/fiber coaxial (HFC) communications system, is depicted in FIG. 1. Such a system may be used in, for example, a cable television network; a voice delivery network, such as a telephone system; and a data delivery network to name but a few. The communications system 100 includes headend equipment 105 for generating forward signals (e.g., voice, video, or data signals) that are transmitted in the forward, or downstream, direction along a first communication medium, such as a fiber optic cable 110. Coupled to the headend 105 are optical nodes 115 that convert the optical signals to radio frequency (RF) signals. The RF signals are further transmitted along a second communication medium, such as coaxial cable 120, and are amplified, as necessary, by one or more distribution amplifiers 125 positioned along the communication medium. Taps 130 included in the communications system split off portions of the forward signals for provision to subscriber equipment 135, such as set-top terminals, computers, telephone handsets, modems, and televisions. It will be appreciated that only one fiber link connecting the headend 105 with a node 115 is shown for simplicity; however, there are typically several different fiber links connecting the headend 105 with several additional nodes 115, amplifiers 125, and subscriber equipment 135.

In a two-way system, the subscriber equipment 135 can also generate reverse electrical signals that are transmitted upstream to the headend equipment 105. Such reverse signals may be amplified by any one or more of the distribution amplifiers 125 and converted to optical signals by the optical node 115 before being provided to the headend equipment 105.

Conventionally, an analog communications system transmits and receives the forward and reverse signals in the analog domain. An example of detailed optical paths including a headend and optical nodes that are suitable for use in an analog broadband communications system 200 is shown in FIG. 2. A headend 205 generates and transmits optical signals via optical transmitters 210a–n downstream through their respective fiber links 215a–n. It will be appreciated that there are a plurality of optical transmitters 210a–n transmitting optical signals to a plurality of nodes 220a–n, where each node 220 services a different pocket of the system depending upon the network design. Within the nodes 220a–n, an optical receiver 230a–n converts the optical signals to electrical signals. A diplex filter 235a–n then isolates the forward electrical signals from the reverse path and provides the electrical signals to coaxial cable 240a–n for delivery to the subscriber equipment 225a–n.

In the reverse path, electrical signals emanating from subscriber equipment 225a–n are transmitted upstream via the coaxial cable 240a–n to the node 220a–n. The diplex filter 235a–n isolates the reverse signals from the forward path and provides the signals to an optical transmitter 245a–n for conversion of the electrical signals to optical signals. The optical signals are then transmitted upstream, via an optical fiber 248a–n to an optical receiver 250a–n located within the headend 205 for further processing.

If additional subscriber homes are added to the network 200, it may be necessary to add an additional node 220 that includes separate links for the forward and reverse path to address the additional subscriber equipment. Additionally, if the operator chooses to optimize the network 200 to accommodate an increase in the amount of reverse signals being transmitted by one optical transmitter, an operator can accomplish this by decreasing the amount of subscriber homes that a node 220 services. For example, an operator can reduce an existing network that includes 2000 subscriber homes per node to 500 subscriber homes per node, and add three additional nodes to the network. It can easily be understood that increasing the size of the network requires a significant amount of equipment and fiber.

It will be appreciated that separate reverse fiber paths, or links, are required because reverse optical signals cannot be combined like reverse electrical signals. More specifically, those skilled in the art will appreciate that when the light from multiple outputs of optical transmitters, where each output has a specific wavelength, is applied simultaneously to an optical receiver, intermodulation distortion results. If the differences between these received wavelengths are sufficiently small, the intermodulation distortion produced in the optical receiver will obscure the desired electrical signals, which are signals from 5 MHz to 42 MHz, at the output of the optical receiver. The drift in wavelength encountered in conventional optical transmitters makes this condition likely to happen.

Recently, new broadband applications, such as interactive multimedia, Internet access, and telephony, are increasing the amount of reverse signals within the reverse bandwidth. As a result, network operators are redesigning the networks 100 to effectively increase the total reverse signal carrying capacity, for example, by digitizing the reverse analog signals and allowing more signals to be transmitted within the existing reverse bandwidth. More specifically, a simplified digital reverse path that is suitable for use in a broadband communications system to digitize analog signals is depicted in FIG. 3. Digitizing the optical signals as shown in FIG. 3 allows the operator to increase the reverse signal carrying capacity that is demanded by the growing number of customers and interactive applications. Briefly, a plurality of digital transmitters 305a–n each including an analog-to-digital (A/D) converter 308a–n receives analog electrical signals from a number of connected subscriber equipment and converts the analog electrical signals to digital optical signals. Linked, via fiber optic cable 309a–n, to each digital transmitter 305a–n is a digital receiver 310a–n that includes a digital-to-analog (D/A) converter 315a–n and which is located further upstream in the network 300. The D/A converter 315a–n converts the received digitized optical signals back to analog electrical signals for delivery to the headend and further processing. An example of a similar digital reverse path is discussed further in commonly assigned, copending patent application Ser. No. 09/102,344, filed Jun. 22, 1998, in the name of "Digital Optical Transmitter" the disclosure of which is incorporated herein by reference.

Digitizing the reverse path, however, is an expensive technique to employ and most network operators may not be ready or able to invest in the required capital costs. Typically, network operators that have been operating for a substantial length of time do not have the digital equipment, such as digital transmitters and receivers, required to digitize the reverse signals. In order to accomplish this, the operators would have to substantially upgrade their system to include the digital equipment and may also have to lay extensive routes of fiber. The majority of operators have historically transmitted and received analog signals over an analog HFC system; therefore, due to the expensive undertaking of sending digital reverse signals, most operators would like an intermediate step to enable the efficient, low-cost delivery of reverse signals over their existing HFC system.

In summary, what is needed are devices and networks that are capable of transmitting and combining reverse optical signals, similar to the combining of reverse electrical signals, in order to ensure the reverse bandwidth is able to accommodate the increasing amount of reverse signals.

DETAILED DESCRIPTION OF A PREFERRED EMBODIMENT

The present invention will be described more fully hereinafter with reference to the accompanying drawings in which like numerals represent like elements throughout the several figures, and in which exemplary embodiments of the invention are shown. This invention may, however, be embodied in many different forms and should not be construed as limited to the embodiments set forth herein; rather, the embodiments are provided so that this disclosure will be thorough and complete, and will fully convey the scope of the invention to those skilled in the art. For example, the embodiments set forth herein refer to an optical transmitter for transmitting reverse optical signals with a burst-mode technique. The burst-mode optical transmitters transmit optical signals only when electrical signals are present at the input of the transmitter. The burst-mode transmission of optical signals allow the reverse optical signals from a plurality of optical transmitters to be combined onto one fiber optic cable. The optical transmitter of the present invention is suitable for use in the reverse fiber path of an HFC communications system and is described more fully hereinbelow.

Figure 4:
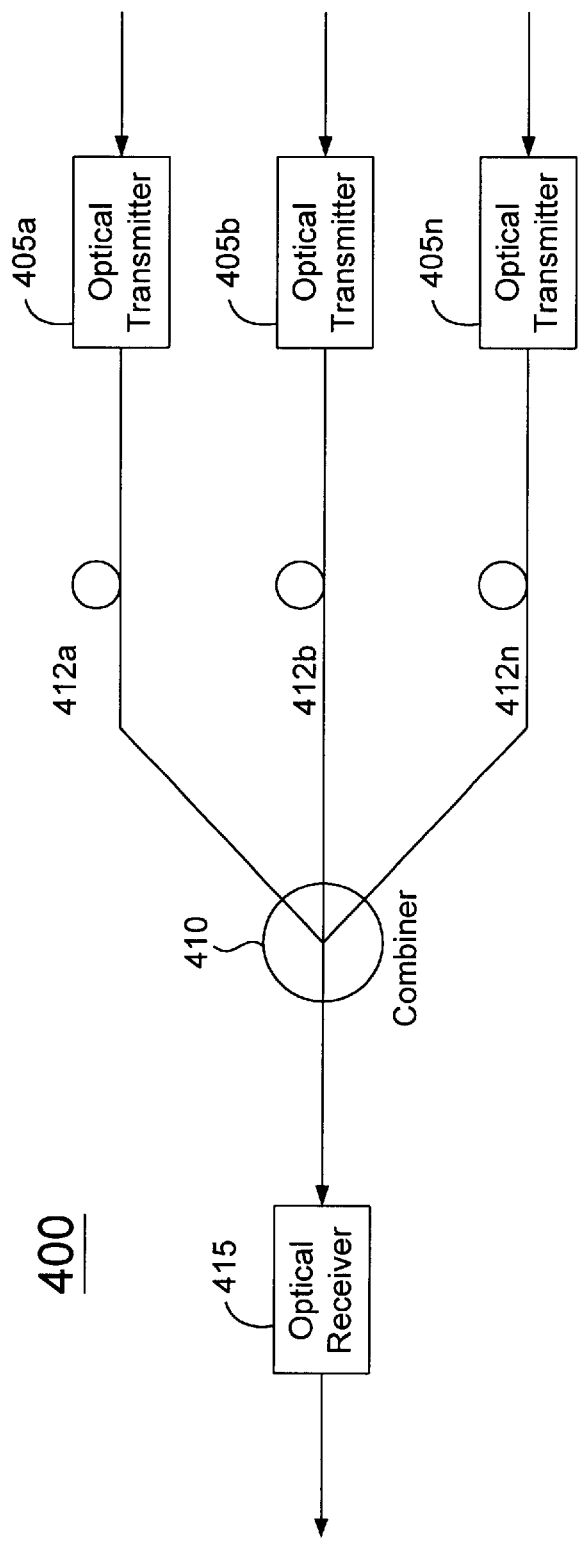
FIG. 4 is a block diagram of an analog reverse path in accordance with the present invention that is suitable for use in the broadband communications system of FIG. 1.

Referring now to FIG. 4, there is illustrated therein an analog reverse path 400 suitable for use in a broadband communications system. Optical signals emanating from a plurality of transmitters 405a–n are combined through an optical combiner 410, which is coupled to the transmitters 405a–n via fiber cables 412a–n. The optical combiner 410 can, for example, be similar to the Scientific-Atlanta, Inc. optical splitter/combiner, p/n 713988. The splitter/combiner product is a passive device that provides the ability to combine signals onto one fiber strand. The combined optical signal is then provided to a single optical receiver 415 that can be located further upstream or within a headend (not shown) for further processing. In this manner, an operator is able to upgrade the network by combining several analog reverse paths, or fiber links 412a–n, to combine the reverse signals without having to use separate fiber optic cable links and optical receivers, thereby substantially reducing the amount of required optical equipment.

Figure 1:
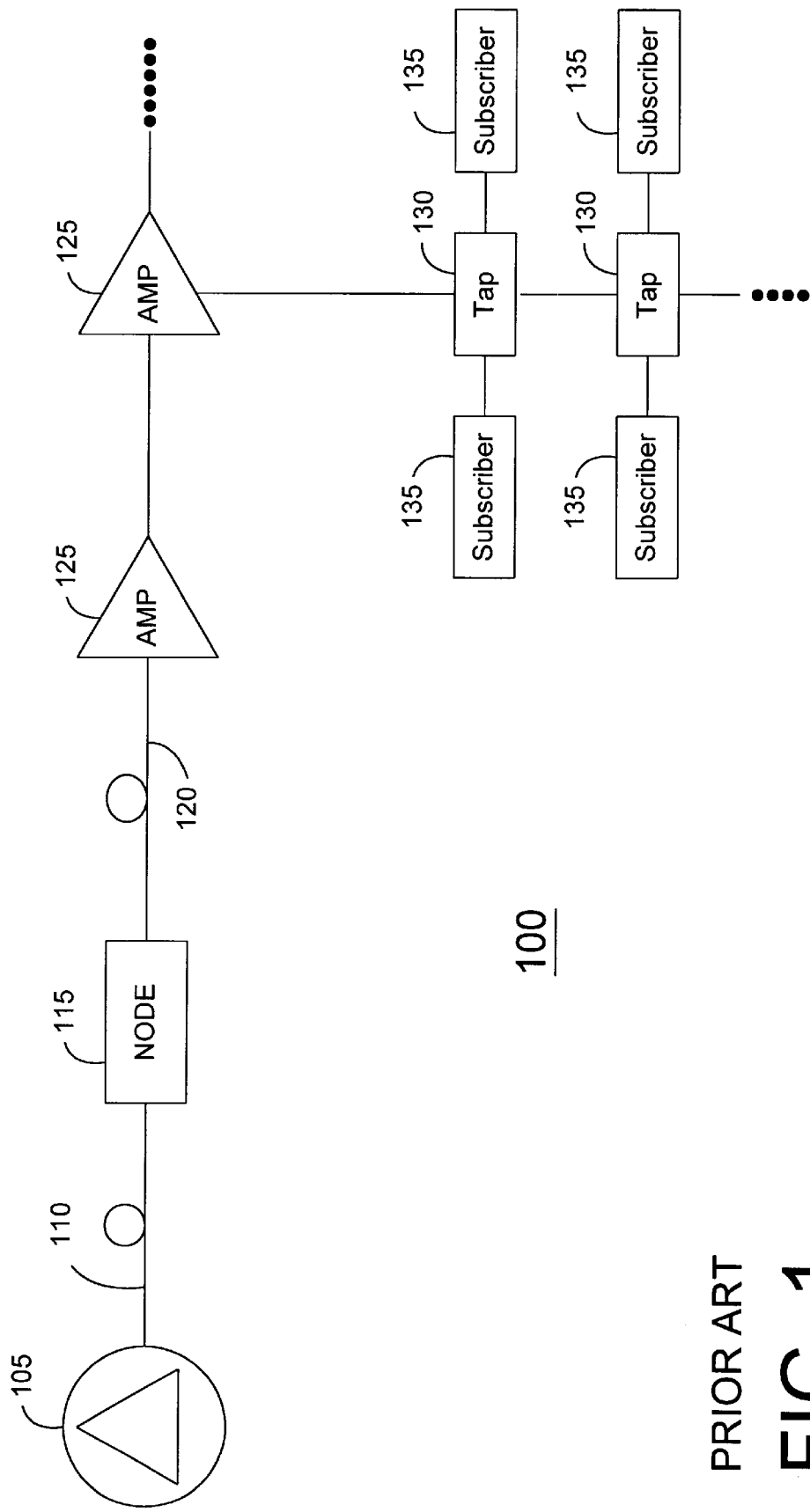
FIG. 1 is a block diagram of a conventional broadband communications system that carries analog optical and electrical signals.
Figure 2:
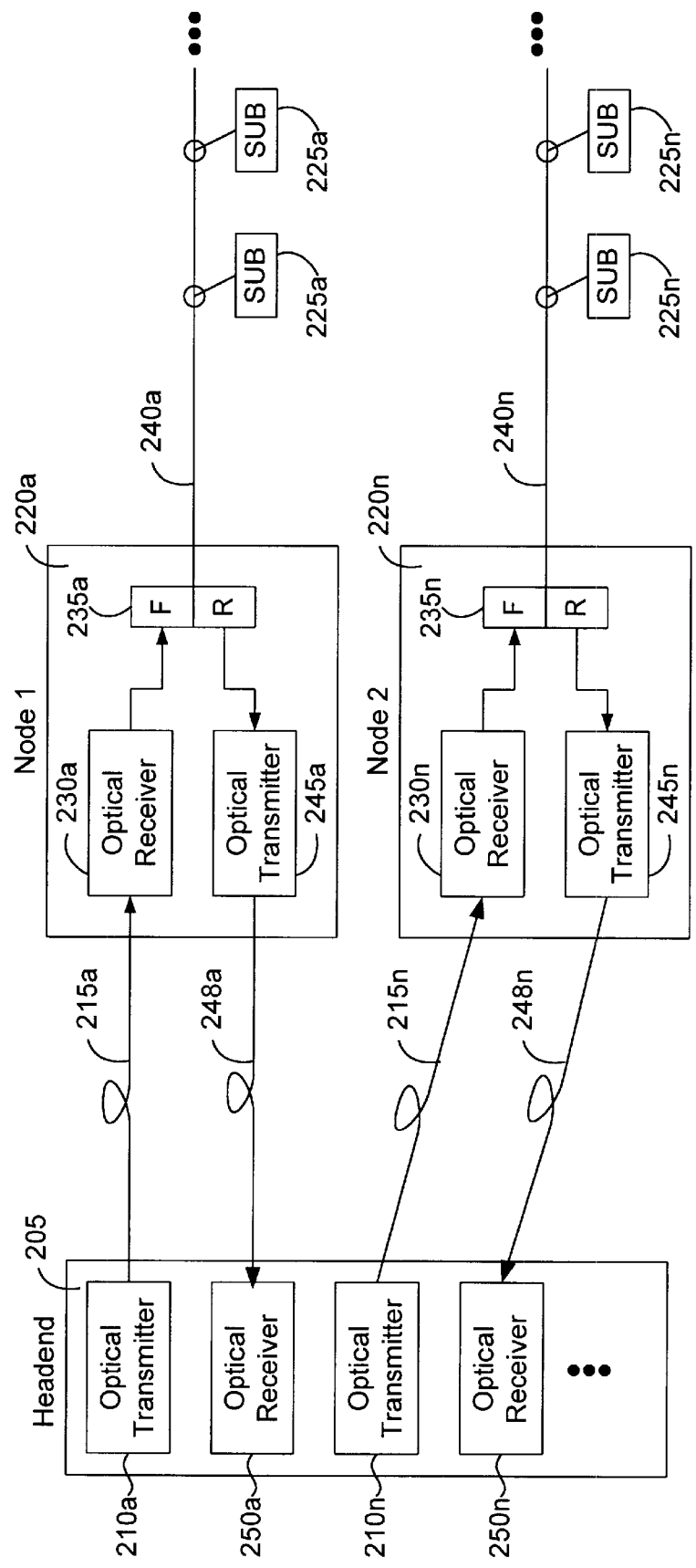
FIG. 2 is a block diagram of a headend and optical nodes that is suitable for use in the broadband communications system of FIG. 1.
Figure 3:
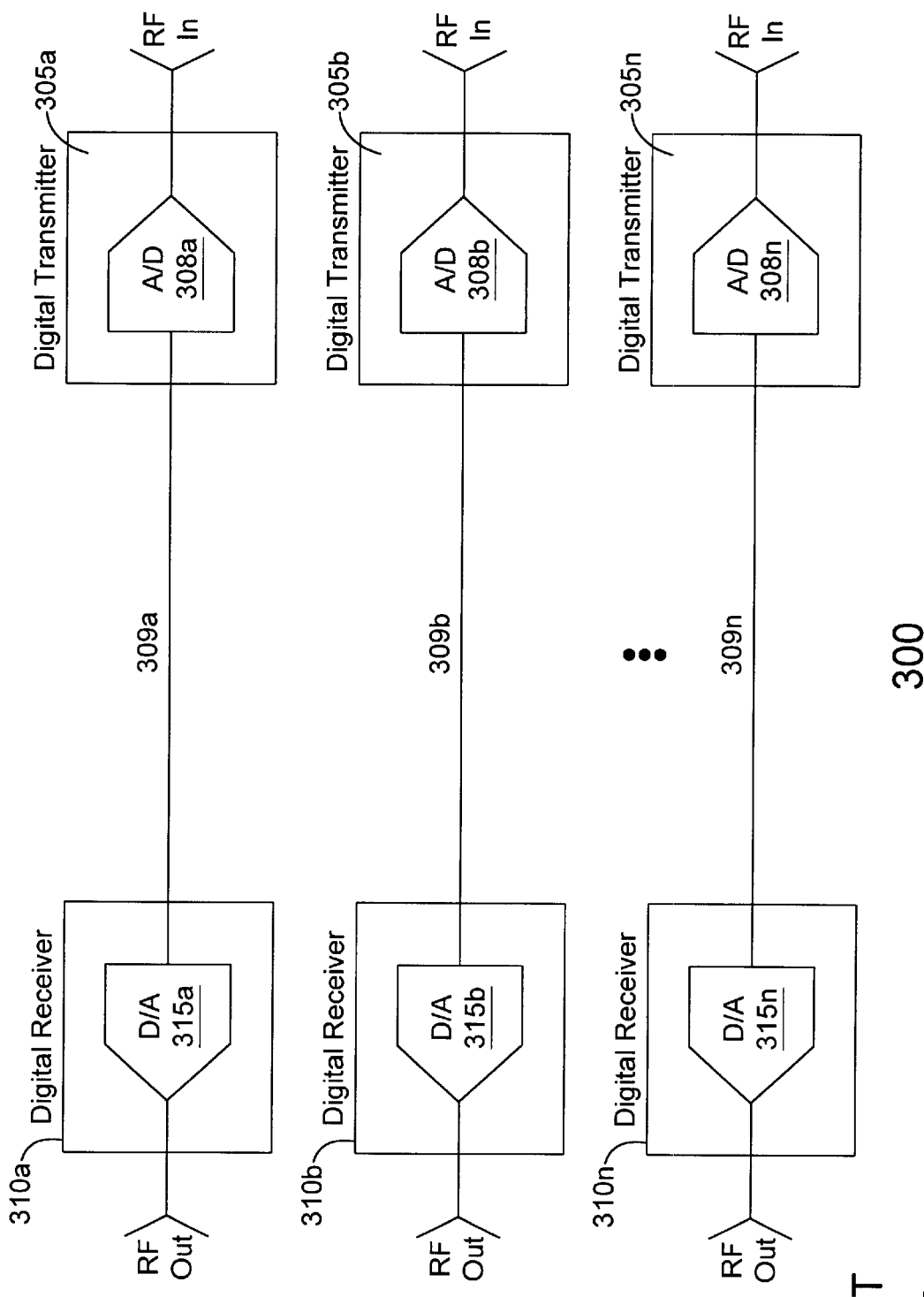
FIG. 3 is a block diagram of a simplified digital reverse path that is suitable for use in the broadband communications system of FIG. 1 for digitizing the reverse optical signals.

As described above, reverse electrical signals can be easily combined using conventional RF techniques in the coaxial portion of the HFC network. Historically, however, reverse optical signals could not be combined within the fiber portion of the analog HFC system due to the negative effects if two or more signals arrive at the receiver each possessing the same or similar wavelengths. This occurrence is fairly typical within an HFC system, such as the systems shown in FIGS. 1 and 2. Consequently, if an optical receiver within a conventional network receives optical signals that each has the same or similar wavelengths, the output of the optical receiver will contain only noise resulting from intermodulation distortion between the similar optical signals.

Figure 5:
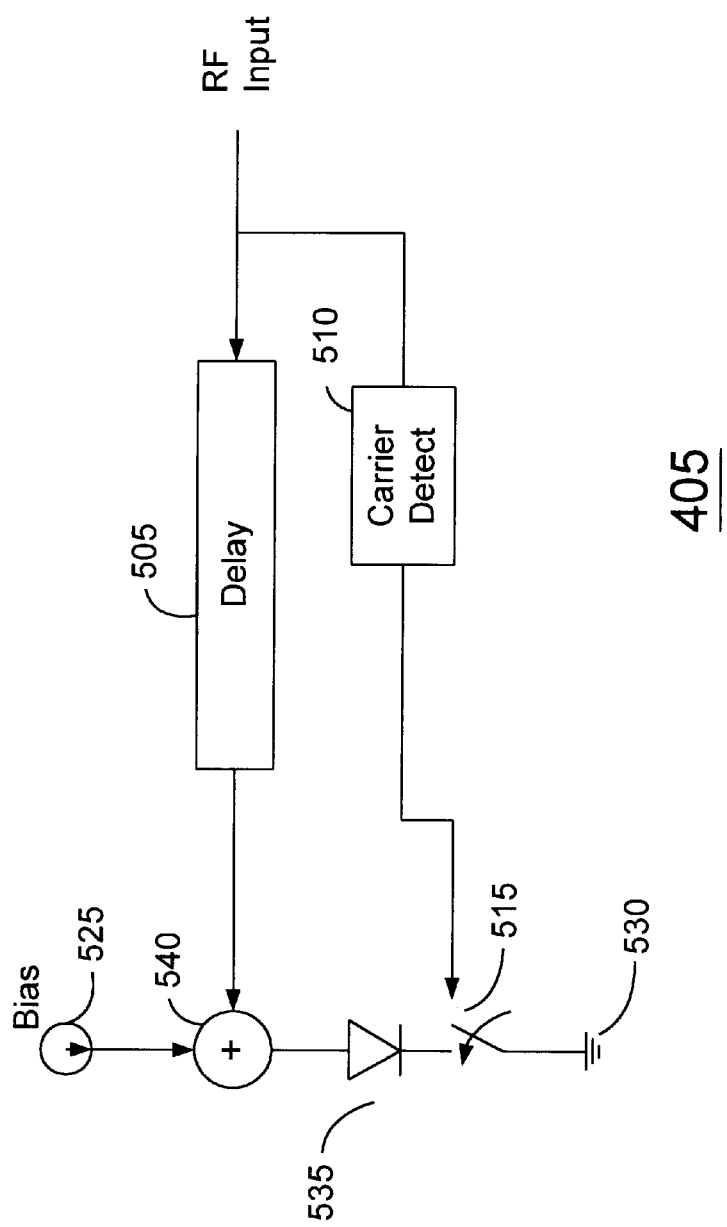
FIG. 5 is a block diagram of a first embodiment of a burst-mode analog transmitter, in accordance with the present invention, that is suitable for use in the analog reverse path of FIG. 4.

FIG. 5 illustrates a first embodiment of the burst-mode analog transmitter 405 that is suitable for use in the reverse communications path 400 of FIG. 4. The burst-mode transmitter 405 allows the output of several optical transmitters to be combined further upstream while preventing any optical signals arriving at the optical receiver 415 (FIG. 4) that may have similar wavelengths. The reverse electrical signals are received at the optical transmitter 405 (FIG. 5) and provided to an analog delay circuit 505. An analog carrier-detect circuit 510 is coupled to the input of the delay circuit 505 to detect when reverse electrical signals are present at the input of the delay circuit 505. The analog carrier-detect circuit 510, as those skilled in the art will appreciate, may include a combination of transistors, capacitors, and resistors. For example, one embodiment may include a comparator that compares a voltage reference with the voltage level of any incoming reverse electrical signals. In this manner, the carrier-detect circuit 510 then controls a switch 515 depending upon the presence of reverse signal activity. More specifically, when the carrier-detect circuit 510 detects the presence of reverse signals, the carrier-detect circuit 510 closes the switch 515, thereby allowing a path for laser bias 525 to pass current through to ground 530.

The delay circuit 505, which may be, for example, simply excess coaxial cable within the transmitter 405 to delay the electrical signals, can be provided because it takes some time for the carrier-detect circuit 510 to detect the presence of reverse signals. Alternatively, the delay circuit may be, for example, a linear-phase low pass filter, where the number of filters depends upon the magnitude of the desired delay The delay circuit 505, therefore, allows the transmission of the entire reverse signal by delaying the signal sufficiently to allow the carrier-detect circuit 510 to detect the signals and close the switch 515. When the switch 515 is closed, laser 535 is enabled by current flow from the laser bias 525. The output of the delay circuit 505 is summed via summer 540 with the laser bias current and then applied to the laser 535. The laser 535 then converts the reverse electrical signal to an optical signal. More specifically, the laser 535 provides the optical signal as an output power that is generally linearly proportional to the amount of current provided by the reverse signals. The laser light emitted by laser 535 is coupled to the fiber optic portion of the communications system. The output optical signal is then combined further upstream along with other optical signals that are being transmitted from additional optical transmitters.

Figure 6:
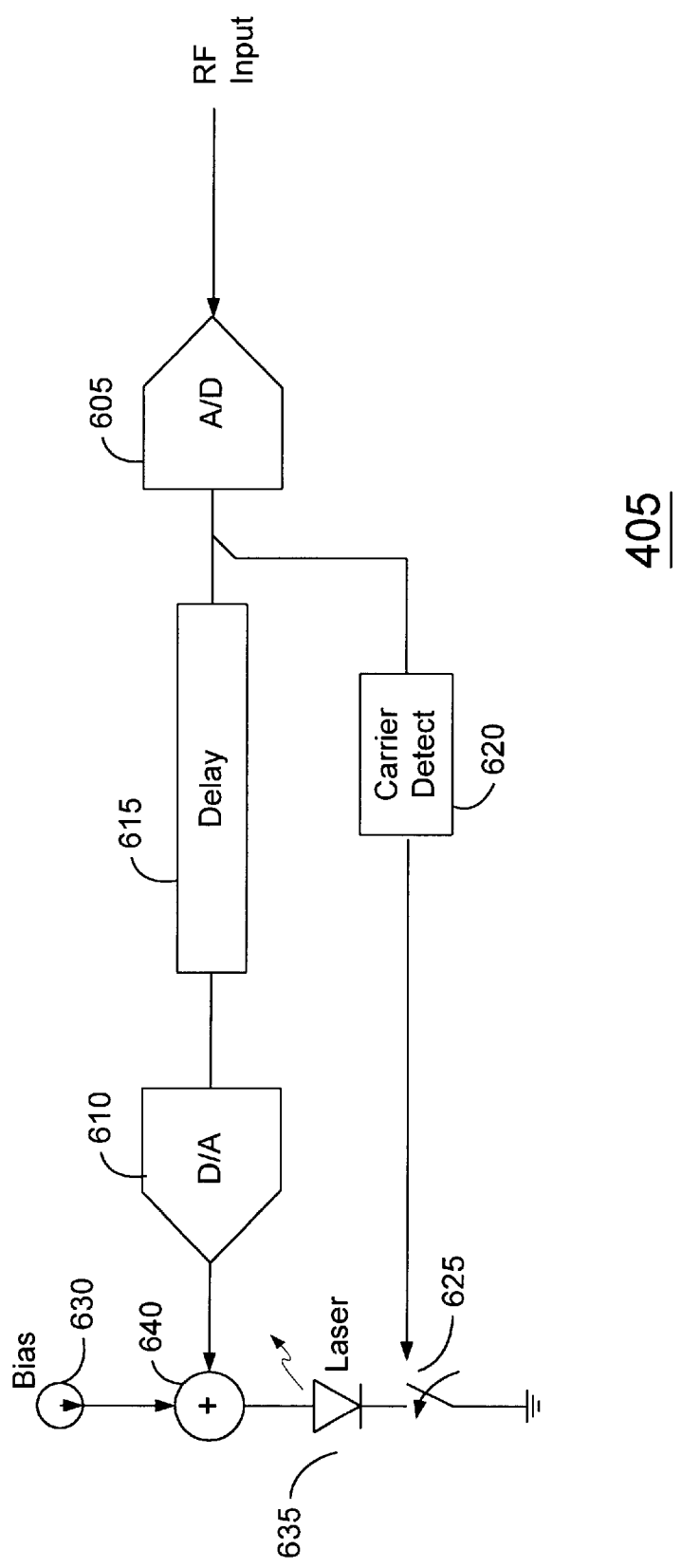
FIG. 6 is a block diagram of a second embodiment of a burst-mode analog transmitter, in accordance with the present invention, that is suitable for use in the analog reverse path of FIG. 4.

A second embodiment of a burst-mode transmitter in accordance with the present invention is shown in FIG. 6. Illustrated in FIG. 6 is a burst-mode optical transmitter that changes the incoming reverse electrical signal to a digital signal via an analog-to-digital (A/D) converter 605. The digital signal is then converted back to an electrical signal via a digital-to-analog (D/A) converter 610 before transmission upstream. In this manner, the digitization of the electrical signals facilitates the use of a low-cost digital delay circuit 615, such as registers or random access memory (RAM), to introduce any delay necessary to give carrier-detect circuit 620 sufficient time to detect the presence of the electrical signal. Moreover, the carrier-detect circuit 620 may be implemented using a low-cost digital format that includes a few gates and counters, rather than the carrier-detect circuit 510 of FIG. 5, which uses several analog components. Similar to the first embodiment of the present invention, the carrier-detect circuit 620 controls switch 625 when a signal is detected, thereby allowing current provided from laser bias 630 to flow through to ground, thereby enabling laser 635. The laser bias current is then summed with the reverse electrical signals via summer 640. Finally, the laser 635 provides an optical signal that is indicative to the electrical signal for further transmission upstream.

Referring again to FIG. 4, the outputs of the plurality of optical transmitters 405 are combined through the optical combiner 410. It will be appreciated that the optical combiner 410 can be a conventional optical combiner. Again, the optical combiner 410 is not always being presented with optical signals from all the connected optical transmitters 405a–n due to reverse electrical signals not always being presented to the optical transmitters 405a–n. The burst-mode analog transmitter 405a–n in accordance with the present invention, therefore, does not always present an output optical signal. In contrast, the conventional optical transmitters 245a–n (FIG. 2) transmit a continuous optical signal regardless of reverse signals being presented to the input of the transmitter, thereby increasing the opportunity for similar wavelengths to arrive at the optical receiver. Advantageously, the present invention transmits reverse electrical signals only when reverse signals are received at the optical transmitters, thereby rendering an efficient optical transmitter.

In summary, a burst-mode optical transmitter 405 that transmits optical signals only when presented with input electrical signals allows reverse optical signals from a plurality of optical transmitters to be combined within the analog HFC reverse path 400. Advantageously, this allows an operator to either add optical transmitters 405 to the network in accordance with the present invention or, alternatively, add a drop-in module that adapts existing optical transmitters to resemble the optical transmitters 405 in accordance with the present invention. In this manner, separate fiber links will link the combiner 410 with the plurality of optical transmitters 405a–n. The combiner 410 then sends the combined optical signals to one optical receiver 415. The present invention, therefore, allows a substantial decrease in the requirements for optical fiber and the number of optical receivers 415 while allowing the operator an efficient, low-cost delivery system for the reverse analog signals.

What is claimed is:

1. An optical transmitter for receiving electrical signals and for providing optical signals in a communications network, the optical transmitter comprising:

an analog-to-digital (A/D) converter coupled to an input of the optical transmitter for converting the electrical signals to digital signals;

a delay circuit coupled to the A/D converter for delaying the digital signals;

a digital-to-analog (D/A) converter coupled to the delay circuit for converting the digital signals back to analog signals;

a digital carrier-detect circuit coupled to the A/D converter for detecting the presence of digital signals, which are representative of the input electrical signals;

a switch responsive to the carrier-detect circuit; and a laser coupled to the D/A converter for converting the analog signals into the optical signals;

wherein the digital carrier-detect circuit closes the switch when detecting the presence of digital signals and opens the switch in the absence of digital signals, whereby the optical transmitter transmits optical signals only when presented with electrical signals at the input.

2. The optical transmitter of claim 1, wherein the delay circuit delays the digital signals by a predetermined period of time.

3. The optical transmitter of claim 1, wherein the communications network uses a plurality of optical transmitters.

4. The optical transmitter of claim 3, wherein the communications network further includes:

a combiner coupled to the plurality of optical transmitters for receiving optical signals from each optical transmitter and for providing a combined optical signal.

5. The optical transmitter of claim 4, wherein the communications network further includes:

an optical receiver coupled to the combiner for converting the combined optical signal to a combined electrical signal; and a headend coupled to the optical receiver for processing the combined electrical signal.

6. In an optical transmitter for transmitting optical signals with burst-mode transmissions, a method for the transmission of burst-mode signals, comprising the steps of:

receiving electrical signals at an input port of the optical transmitter;

converting the electrical signals into digital signals;

delaying the digital signals by a predetermined period of time;

converting the delayed digital signals into analog signals;

detecting the presence of the input electrical signals with a carrier-detect circuit;

in response to the carrier-detect circuit, converting the analog signals into the optical signals; and transmitting the optical signals;

wherein the optical signals are only transmitted when input electrical signals are detected.

7. In a broadband communications system for transmitting combined optical signals, a plurality of optical transmitters each providing optical signals with burst-mode transmissions to an optical combiner, a method for combining the optical signals from the plurality of optical transmitters, comprising the steps of:

in each optical transmitter,
receiving electrical signals at an input port of an optical transmitter,
converting the electrical signals into digital signals;
delaying the digital signals by a predetermined period of time;
converting the delayed digital signals into analog signals;
detecting the presence of the electrical signals with a carrier-detect circuit;
in response to the carrier-detect circuit, converting the analog-signals to optical signals;
transmitting the optical signals upstream; and in the optical combiner,
combining the optical signals from each of the plurality of optical transmitters;

wherein each of the plurality of optical transmitters only transmit optical signals when electrical signals are detected.

* * * * *

UNITED STATES PATENT AND TRADEMARK OFFICE
CERTIFICATE OF CORRECTION

PATENT NO.       : 6,509,994 B2
APPLICATION NO.  : 09/840753
DATED            : January 21, 2003
INVENTOR(S)      : West et al.

It is certified that error appears in the above-identified patent and that said Letters Patent is hereby corrected as shown below:

1. On Title Page, under Item "(75) Inventor:", please correct the names of the inventors to read as follows: -- Lamar E. West, Jr., Maysville, GA (US); Donald Sorenson, Lawrenceville, GA (US) --

Signed and Sealed this

Third Day of October, 2006

JON W. DUDAS
*Director of the United States Patent and Trademark Office*